United States Patent
Liang

(10) Patent No.: US 9,492,041 B1
(45) Date of Patent: Nov. 15, 2016

(54) ADJUSTABLE ROTARY DAMPER FOR TOILET SEATS

(71) Applicant: REGENT (HONG-KONG) LIMITED SPEEDY, Hong Kong (CN)

(72) Inventor: Zhuchang Liang, Zhongshan (CN)

(73) Assignee: REGENT (HONG-KONG) LIMITED SPEEDY, Hong Kong (CN)

( * ) Notice: Subject to any disclaimer, the term of this patent is extended or adjusted under 35 U.S.C. 154(b) by 0 days.

(21) Appl. No.: 14/818,269

(22) Filed: Aug. 4, 2015

(51) Int. Cl.
| | |
|---|---|
| F16D 57/00 | (2006.01) |
| A47K 13/12 | (2006.01) |
| F16F 9/14 | (2006.01) |
| F16F 9/44 | (2006.01) |

(52) U.S. Cl.
CPC ............... *A47K 13/12* (2013.01); *F16F 9/145* (2013.01); *F16F 9/44* (2013.01); *F16F 2222/12* (2013.01); *F16F 2232/02* (2013.01)

(58) Field of Classification Search
CPC .......... F16F 9/34; F16F 9/145; A47K 13/10; A47K 13/12
USPC .............. 188/290, 293, 296; 16/82, 83, 330; 4/236, 248
See application file for complete search history.

(56) References Cited

U.S. PATENT DOCUMENTS

| | | | | |
|---|---|---|---|---|
| 7,111,712 | B2 * | 9/2006 | Orita ......................... | F16F 9/48 188/290 |
| 7,798,296 | B2 * | 9/2010 | Iwashita ................. | F16F 9/145 188/290 |
| 8,167,100 | B2 * | 5/2012 | Chen ....................... | A47K 13/12 188/290 |
| 8,439,172 | B2 * | 5/2013 | Lee ......................... | A47K 13/12 16/330 |
| 2003/0126717 | A1 * | 7/2003 | Iwashita ................ | A47K 13/10 16/82 |
| 2003/0150678 | A1 * | 8/2003 | Iwashita ................. | F16F 9/145 188/296 |

* cited by examiner

*Primary Examiner* — Christopher Schwartz
(74) *Attorney, Agent, or Firm* — Matthias Scholl, PC; Matthias Scholl

(57) ABSTRACT

A damper, including: a tube body, a central spindle, and two laminae. The laminae each include a curved plate, an oil-sealing rib plate and an oil-discharging rib plate which are disposed at two ends of the curved plate, respectively. The inner wall of the tube body is provided with two convex splitters. One end of the central spindle is inserted into an inner chamber of the tube body and sealed in the tube body; the other end of the central spindle extends outside the tube body. The central spindle includes two ribs, and the laminae are disposed between the ribs and the tube body. The ribs, the laminae and the splitters combined divide the inner chamber of the tube body into two pressure chambers and two nonpressure chambers; both the pressure chambers and the nonpressure chambers are filled with damping oil.

4 Claims, 5 Drawing Sheets

ADJUSTABLE ROTARY DAMPER FOR TOILET SEATS

BACKGROUND OF THE INVENTION

Field of the Invention

This invention relates to an adjustable rotary damper for toilet seats.

Description of the Related Art

Typically, the cover plate and the seat of a toilet are fixed via a bearing pin or a spring. Such connection mode often causes unwanted noise when the cover plate is closed, and the connection parts often rust.

An improved toilet employs an oil damper, which includes a rib plate including a jagged opening at the end thereof for oil discharging. However, the rib plate is thin so it is easily damaged after a long time service. In addition, the damper performance of the oil damper is greatly related to the dimensions of the jagged opening. In another word, the dimensions of the jagged opening must be accurately designed, which increases the processing difficulty and production costs.

SUMMARY OF THE INVENTION

In view of the above-described problems, it is one objective of the invention to provide an adjustable rotary damper for toilets that has a simple structure, convenient and accurate production process, good quality and damping performance, and long duration.

To achieve the above objective, in accordance with one embodiment of the invention, there is provided an adjustable rotary damper for toilets, comprising: a tube body, a central spindle, and two laminae, the laminae each comprising a curved plate, an oil-sealing rib plate and an oil-discharging rib plate which are disposed at two ends of the curved plate, respectively. An inner wall of the tube body is provided with two convex splitters; one end of the central spindle is inserted into an inner chamber of the tube body and sealed in the tube body; another end of the central spindle extends outside the tube body. The central spindle comprises two ribs, and the laminae are disposed between the ribs and the tube body. The ribs, the laminae and the splitters combine to divide the inner chamber of the tube body into two pressure chambers and two nonpressure chambers; both the pressure chambers and the nonpressure chambers are filled with damping oil; a space formed by the oil-sealing rib plate and the oil-discharging rib plate of the laminae allows the ribs to move axially. The oil-sealing rib plate and the oil-discharging rib plate each comprise a plurality of oil-discharging openings; when the central spindle rotates clockwise, one side of the ribs of the central spindle abuts against the oil-discharging rib plate, so that an oil guide passage is formed by the laminae, the tube body, and the ribs; when the central spindle rotates anticlockwise, another side of the ribs of the central spindle abuts against the oil-sealing rib plate, so that the oil guide passage is blocked. The two splitters are disposed symmetrically on the inner wall of the tube body.

In a class of this embodiment, a baffle plate is disposed in a middle of the tube body; the baffle plate comprises convection holes corresponding to two sides of the ribs, the convection holes respectively communicating with the pressure chambers and the nonpressure chambers; an oil storage pipe is disposed in the tube body and communicates with the convection holes; a regulating unit is inserted into the oil storage pipe to adjust oil storage volume in the oil storage pipe.

In a class of this embodiment, two oil storage pipes are symmetrically disposed in the tube body; a casing pipe is disposed on the baffle plate and is between the two oil storage pipes; the casing pipe comprises female screws; the regulating unit comprises a base plate and two pillars disposed on two ends of the base plate; the two pillars are adapted to inserting into the two oil storage pipes; the base plate comprises an insert hole in a middle thereof; an adjusting screw is disposed at a corresponding end of the base plate and passes through the insert hole to connect to the female screws of the caring pipe.

In a class of this embodiment, the pillars comprise a circular groove, and a seal ring is disposed between the circular groove and an inner wall of the oil storage pipes.

Advantages of the damper for toilets according to embodiments of the invention are summarized as follows.

1. The damper comprises a curved plate, an oil-sealing rib plate and an oil-discharging rib plate which are disposed at two ends of the curved plate, and the space formed by the oil-sealing rib plate and the oil-discharging rib plate of the laminae allows the ribs to move axially. In addition, the oil-sealing rib plate and the oil-discharging rib plate each comprise a plurality of oil-discharging openings. The curved plate is firm and not easy to break even for a long term service.

2. The size of the oil guide passage is only determined by the size of the oil-discharging openings, and thus, to accurately control the size of the oil-discharging openings can control the falling speed of the cover plate or the toilet seat. So, the processing is convenient and has small error.

3. The tube body comprises the oil storage pipe communicating with the convection holes, the regulating unit, and the adjusting screws. When the falling speed of the cover plate or toilet seat needs adjusting, to rotate the adjusting screws whereby altering the length of the pillars of the regulating unit in the oil storage pipes. Thus, the oil volume in the oil storage pipes is adjusted and the flow speed of the damping oil can be controlled, thereby achieving the adjustment of the falling speed of the cover plate or toilet seat.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an adjustable rotary damper for toilets are described below. It should be noted that the following examples are intended to describe and not to limit the invention.

Figure 1:
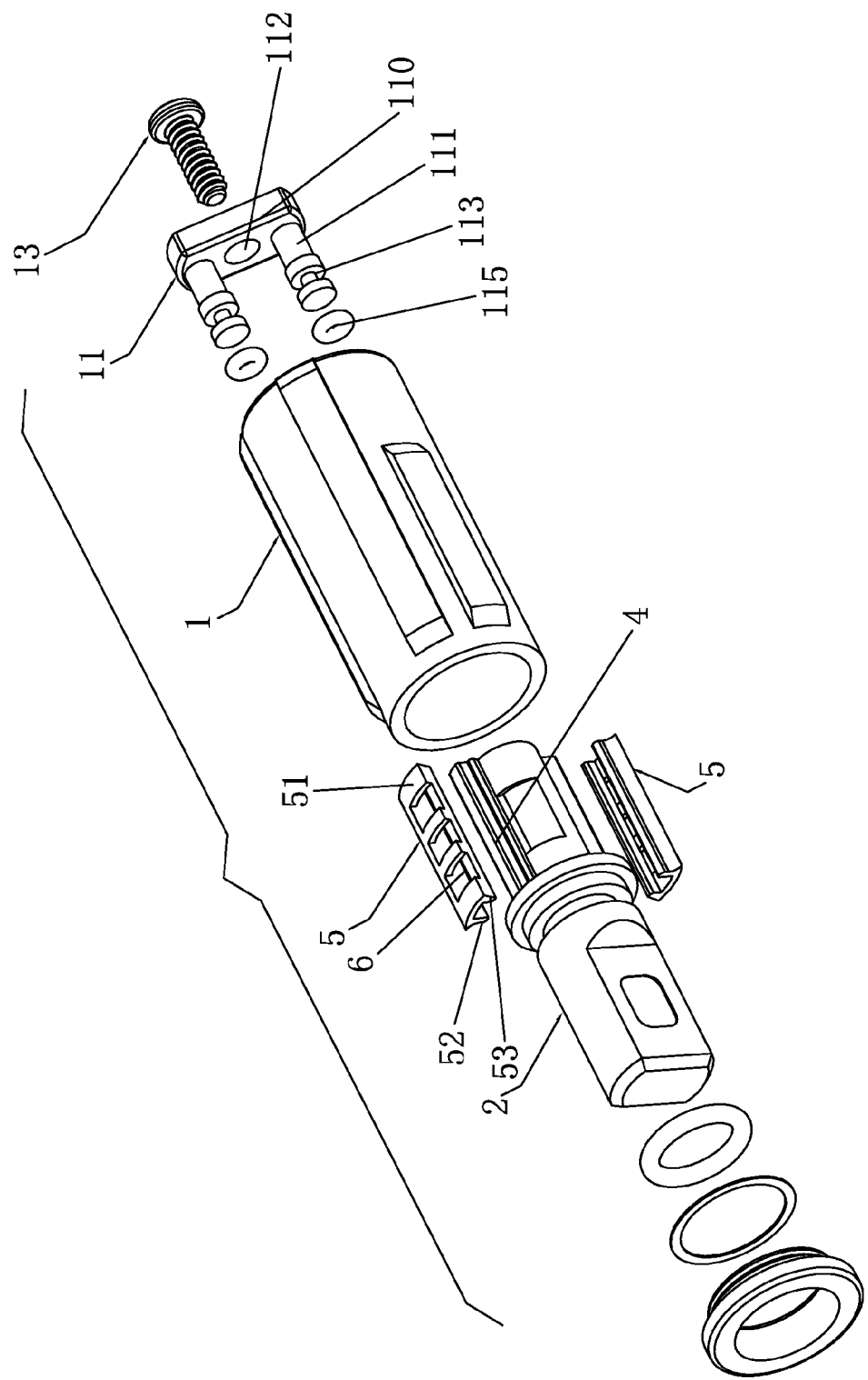
FIG. 1 is an exploded view of an adjustable rotary damper for toilets in accordance with one embodiment of the invention.
Figure 2:
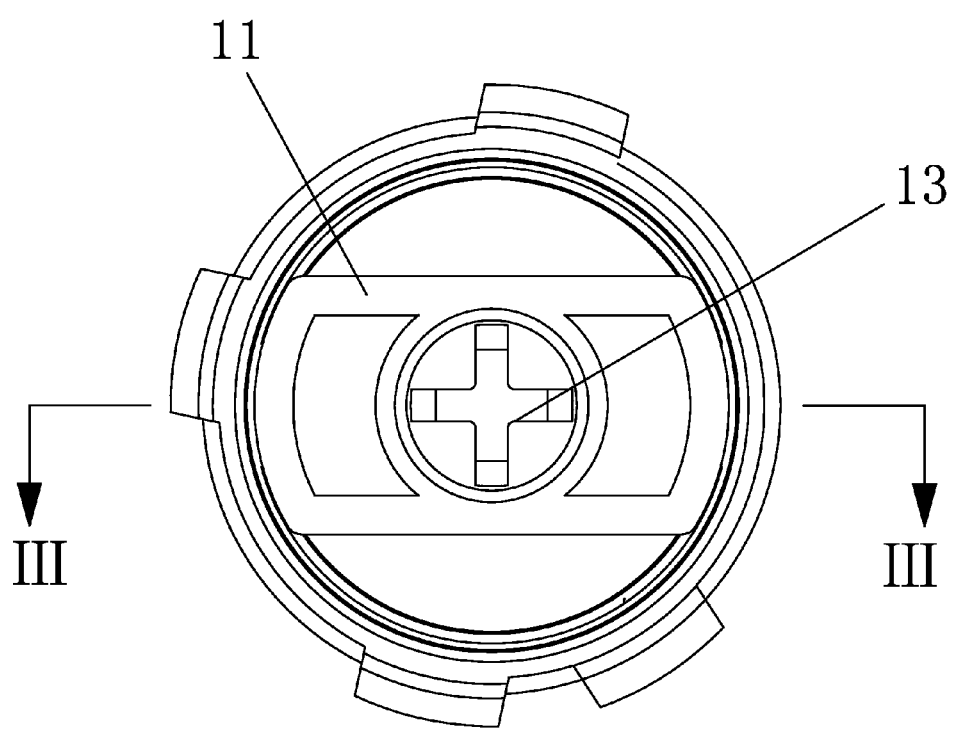
FIG. 2 is a side view of an adjustable rotary damper for toilets in accordance with one embodiment of the invention.
Figure 3:
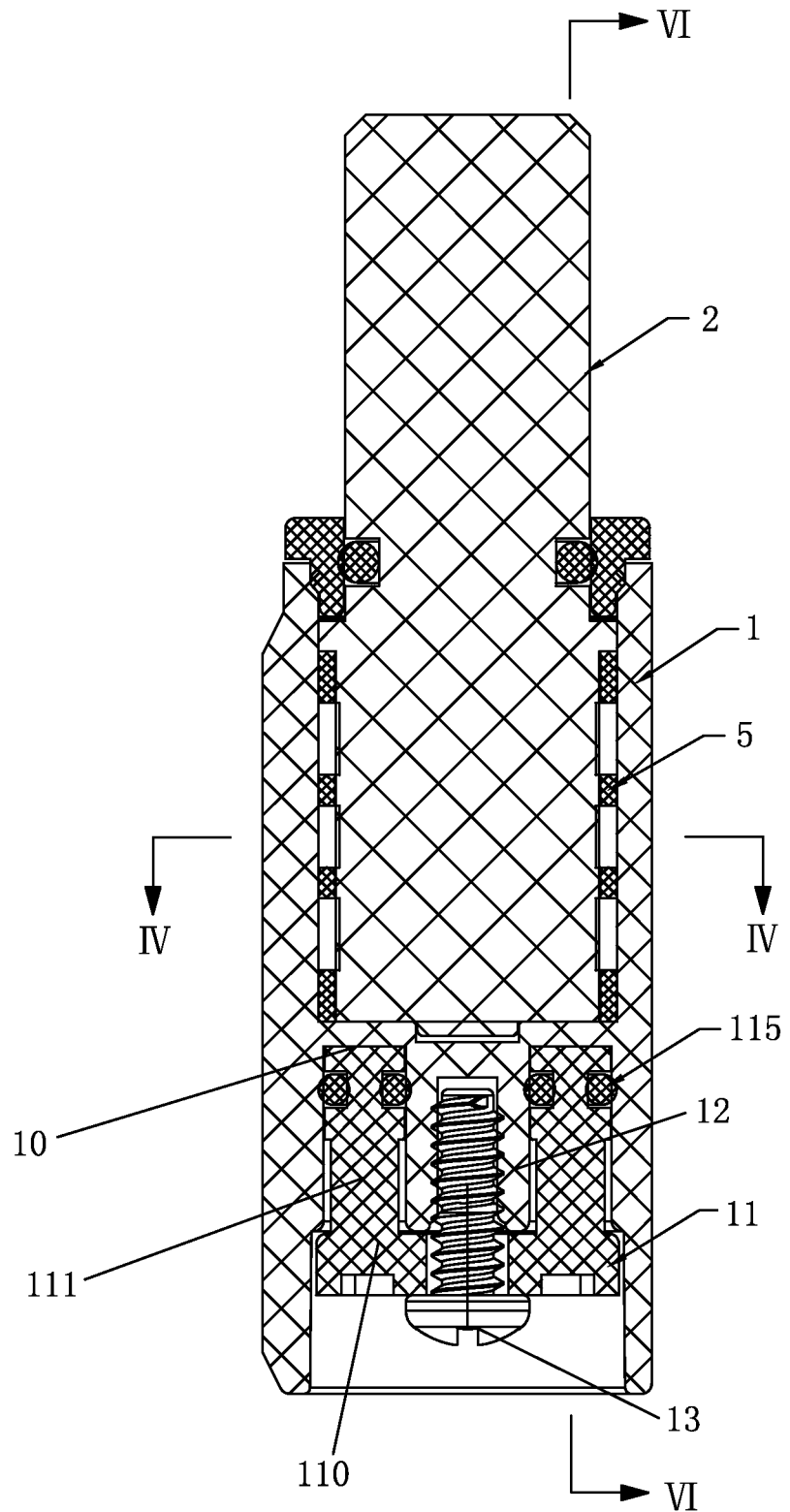
FIG. 3 is a sectional view taken from line III-III in FIG. 2.
Figure 4:
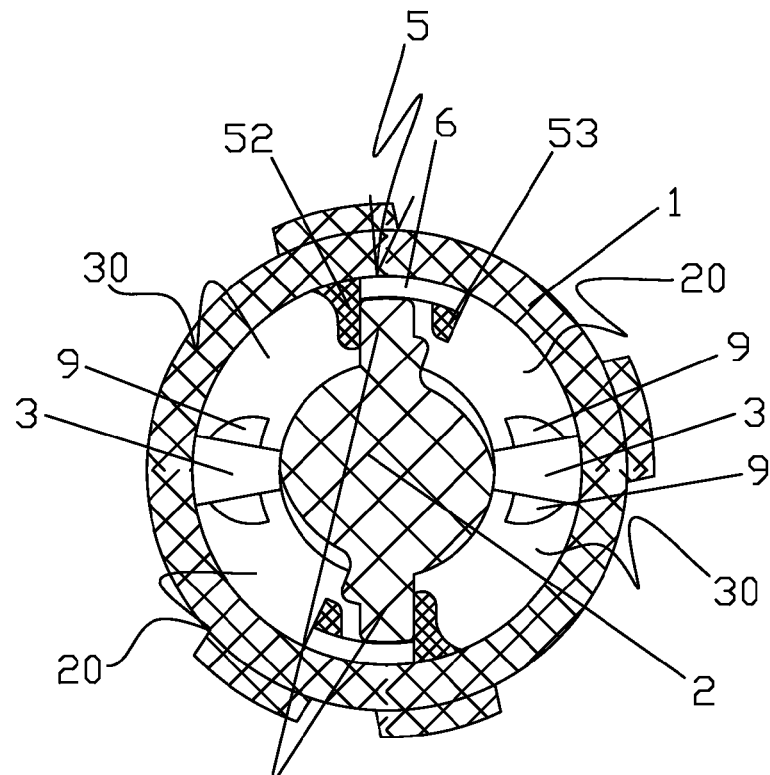
FIG. 4 is a sectional view taken from line IV-IV in FIG. 3 showing the closing of an oil guide passage in accordance with one embodiment of the invention.
Figure 5:
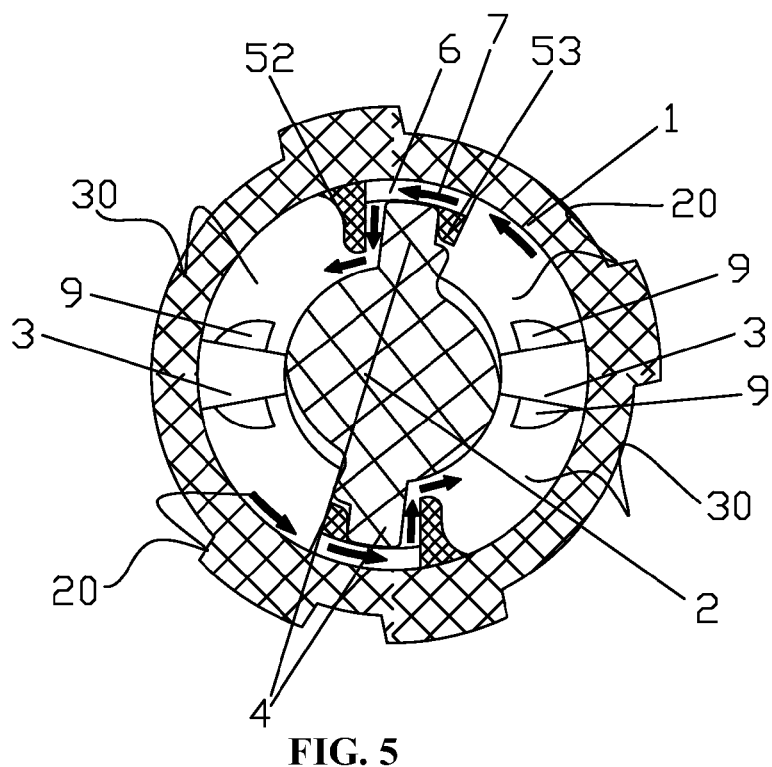
FIG. 5 is a sectional view taken from line IV-IV in FIG. 3 showing the opening of an oil guide passage in accordance with one embodiment of the invention.
Figure 6:
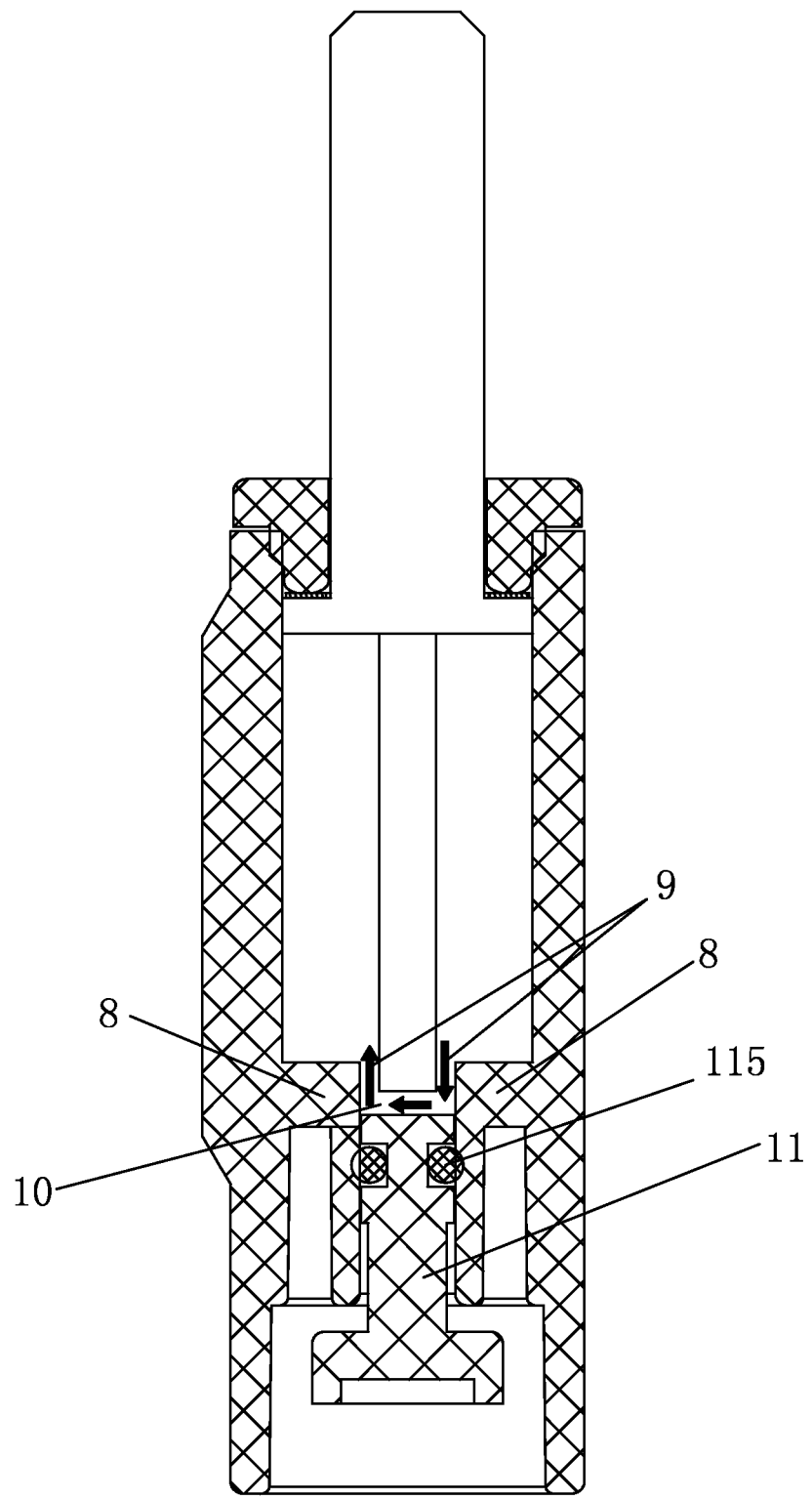
FIG. 6 is a sectional view taken from line VI-VI in FIG. 3.

As shown in FIG. 1, an adjustable rotary damper for toilets comprises a tube body 1 and a central spindle 2. The inner wall of the tube body 1 is provided with convex splitters 3. One end of the central spindle 2 is inserted into the chamber of the tube body 1 and sealed using a seal ring, a gasket and a press plate. The other end of the central spindle 2 passes through the press plate and extends outside the tube body 1. The central spindle 2 comprises two ribs 4 symmetrically disposed on the outer wall thereof, and the laminae 5 are disposed between the ribs and the tube body 1. The ribs 4, the laminae 5 and the splitters 3 combine to divide the inner chamber of the tube body 1 into two pressure chambers 30 and two nonpressure chambers 20; both the pressure chambers 30 and the nonpressure chambers 20 are filled with damping oil. A space formed by the oil-sealing rib plate 52 and the oil-discharging rib plate 53 of the laminae 5 allows the ribs 4 to move axially. The oil-sealing rib plate 52 and the oil-discharging rib plate 53 each comprise a plurality of oil-discharging openings 6. When the central spindle 2 rotates clockwise, one side of the ribs 4 of the central spindle 2 abuts against the oil-discharging rib plate 53, the gaps between the oil-discharging openings 6, the ribs 4, and the oil-sealing rib plate 52 communicate, so that an oil guide passage 7 is formed by the laminae 5, the tube body 1, and the ribs 4. The oil guide passage 7 enables the pressure chambers 30 to communicate with the nonpressure chambers 20. When the central spindle 2 rotates anticlockwise, another side of the ribs 4 of the central spindle 2 abuts against the oil-sealing rib plate 53, so that the oil guide passage 7 is blocked, and the pressure chambers 30 cannot communicate with the nonpressure chambers 20. The two splitters 3 are disposed symmetrically on the inner wall of the tube body 1. The outer wall of the curved plate 51 of the laminae 5 is tangent to the inner wall of the tube body 1.

A baffle plate 8 is disposed in the middle of the tube body 1; the baffle plate 8 comprises convection holes 9 at two sides of the ribs, the convection holes 9 respectively communicating with the pressure chambers and the nonpressure chambers; an oil storage pipe 10 is disposed in the tube body 1 and communicates with the convection holes 9; a regulating unit 11 is inserted into the oil storage pipe 10 to adjust oil storage volume in the oil storage pipe 10.

Two oil storage pipes 10 are symmetrically disposed in the tube body 1; a casing pipe 12 is disposed on the baffle plate 8 and is between the two oil storage pipes 10; the casing pipe 12 comprises female screws; the regulating unit 11 comprises a base plate 110 and two pillars 111 disposed on two ends of the base plate 110; the two pillars 111 are adapted to inserting into the two oil storage pipes 10; the base plate 110 comprises an insert hole 112 in a middle thereof; an adjusting screw 13 is disposed at a corresponding end of the base plate 110 and passes through the insert hole 112 to connect to the female screws of the caring pipe 12. The pillars 111 comprise a circular groove 113, and a seal ring 115 is disposed between the circular groove 113 and an inner wall of the oil storage pipes 10.

The working principle of the damper is described as follows. When the cover plate or toilet seat is raised up, the central spindle 2 is driven to rotate clockwise, one side of the ribs 4 of the central spindle 2 abuts against the oil-discharging rib plate 53, so that the oil guide passage 7 is formed by the laminae 5, the tube body 1, and the ribs 4. As a result, the damping oil in the nonpressure chambers 20 flows into the pressure chambers 30 via the oil guide passage 7, or flows into the pressure chambers 30 via the convection holes 9 and the oil storage pipe 10. When the cover plate or toilet seat is put down, the central spindle 2 is driven to rotate anticlockwise, another side of the ribs 4 of the central spindle 2 abuts against the oil-sealing rib plate 53, so that the oil guide passage 7 is blocked, and the pressure chambers 30 cannot communicate with the nonpressure chambers 20. As a result, the damping oil in the pressure chambers 30 cannot flow into the nonpressure chambers 20 via the oil guide passage 7, but can flow into the nonpressure chambers 20 via the convection holes 9 and the oil storage pipe 10. Because the convection holes 9 are much smaller than the oil guide passage 7, the flow speed of the damping oil from the pressure chambers 30 to the nonpressure chambers 20 is rather slow, and thus the cover plate or toilet seat falls slowly.

When the falling speed of the cover plate or toilet seat needs adjusting, to rotate the adjusting screws whereby altering the length of the pillars of the regulating unit in the oil storage pipes. Thus, the oil volume in the oil storage pipes is adjusted and the flow speed of the damping oil can be controlled, thereby achieving the adjustment of the falling speed of the cover plate or toilet seat.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A damper, comprising:
a) a tube body;
b) a central spindle; and
c) two laminae, the two laminae each comprising a curved plate, an oil-sealing rib plate, and an oil-discharging rib plate;
wherein
the oil-sealing rib plate and the oil-discharging rib plate are disposed at two ends of the curved plate, respectively;
two convex splitters are disposed on an inner wall of the tube body;
one end of the central spindle is inserted into an inner chamber of the tube body and sealed in the tube body, and the other end of the central spindle extends outside the tube body;
the central spindle comprises two ribs, and the two laminae are disposed between the ribs and the tube body;
the ribs, the laminae and the splitters combined divide the inner chamber of the tube body into two pressure chambers and two nonpressure chambers; the pressure chambers and the nonpressure chambers are filled with damping oil;
a space formed by the oil-sealing rib plate and the oil-discharging rib plate of the laminae allows the ribs to move axially;
the oil-sealing rib plate and the oil-discharging rib plate each comprise a plurality of oil-discharging openings;
the two splitters are disposed symmetrically on the inner wall of the tube body;
when the central spindle rotates clockwise, one side of the ribs of the central spindle abuts against the oil-discharging rib plate, so that an oil guide passage is formed by the laminae, the tube body, and the ribs; and when the central spindle rotates anticlockwise, another side of the ribs of the central spindle abuts against the oil-sealing rib plate, so that the oil guide passage is blocked.

2. The damper of claim 1, wherein a baffle plate is disposed in a middle of the tube body;

the baffle plate comprises convection holes corresponding to two sides of the ribs, and the convection holes respectively communicate with the pressure chambers and the nonpressure chambers;

an oil storage pipe is disposed in the tube body and communicates with the convection holes; and a regulating unit is inserted into the oil storage pipe to adjust oil storage volume in the oil storage pipe.

3. The damper of claim 2, wherein two oil storage pipes are symmetrically disposed in the tube body;

a casing pipe is disposed on the baffle plate and is between the two oil storage pipes;

the casing pipe comprises female screws;

the regulating unit comprises a base plate and two pillars disposed on two ends of the base plate;

the two pillars are adapted to inserting into the two oil storage pipes;

the base plate comprises an insert hole in a middle thereof; and an adjusting screw is disposed at a corresponding end of the base plate and passes through the insert hole to connect to the female screws of the caring pipe.

4. The damper of claim 3, wherein the pillars each comprise a circular groove, and a seal ring is disposed between the circular groove and an inner wall of the oil storage pipes.

* * * * *